United States Patent [19]

Bussey et al.

[11] Patent Number: 5,773,378
[45] Date of Patent: Jun. 30, 1998

[54] SPENT CATALYST DISTRIBUTION

[75] Inventors: Benjamin Karl Bussey; Philip E. Glasgow; Steven A. Kalota; Phillip K. Niccum, all of Houston, Tex.

[73] Assignee: The M. W. Kellogg Company, Houston, Tex.

[21] Appl. No.: 740,540

[22] Filed: Oct. 30, 1996

[51] Int. Cl.[6] .................................................. B01J 20/34
[52] U.S. Cl. ................................. 502/41; 502/20; 502/34; 502/38; 502/42; 502/48
[58] Field of Search ................... 502/20, 34, 38, 502/41, 42, 43, 48, 51, 52, 514; 422/144, 145; 208/163, 164

[56] References Cited

U.S. PATENT DOCUMENTS

| | | | |
|---|---|---|---|
| 4,150,090 | 4/1979 | Murphy et al. | 422/144 |
| 4,374,750 | 2/1983 | Vickers et al. | 252/417 |
| 4,443,551 | 4/1984 | Lionetti et al. | 502/41 |
| 4,471,063 | 9/1984 | Hettinger | 502/39 |
| 4,610,851 | 9/1986 | Colvert et al. | 422/310 |
| 5,021,222 | 6/1991 | Owen | 422/144 |
| 5,077,252 | 12/1991 | Owen et al. | 502/43 |

FOREIGN PATENT DOCUMENTS 0622116  4/1994  European Pat. Off. .

*Primary Examiner*—Christopher Kim
*Attorney, Agent, or Firm*—John P. Ward

[57] ABSTRACT

A regenerator in a FCC unit, with the reactor elevated above the regenerator and a side entry spent catalyst introduction to the regenerator, is modified by installing a spent catalyst distribution apparatus along a central vertical axis of the regenerator to radially discharge the spent catalyst and 10–50 percent of the regeneration air into the dense phase of the catalyst. The existing compressor may be used to supply the regeneration air to the spent catalyst distributor. The remaining 50–90 percent of the regeneration air is supplied to the air distribution grid. The retrofit improves spent catalyst distribution and mixing in the regenerator to avoid dilute phase CO combustion or afterburning in the offgas.

6 Claims, 2 Drawing Sheets

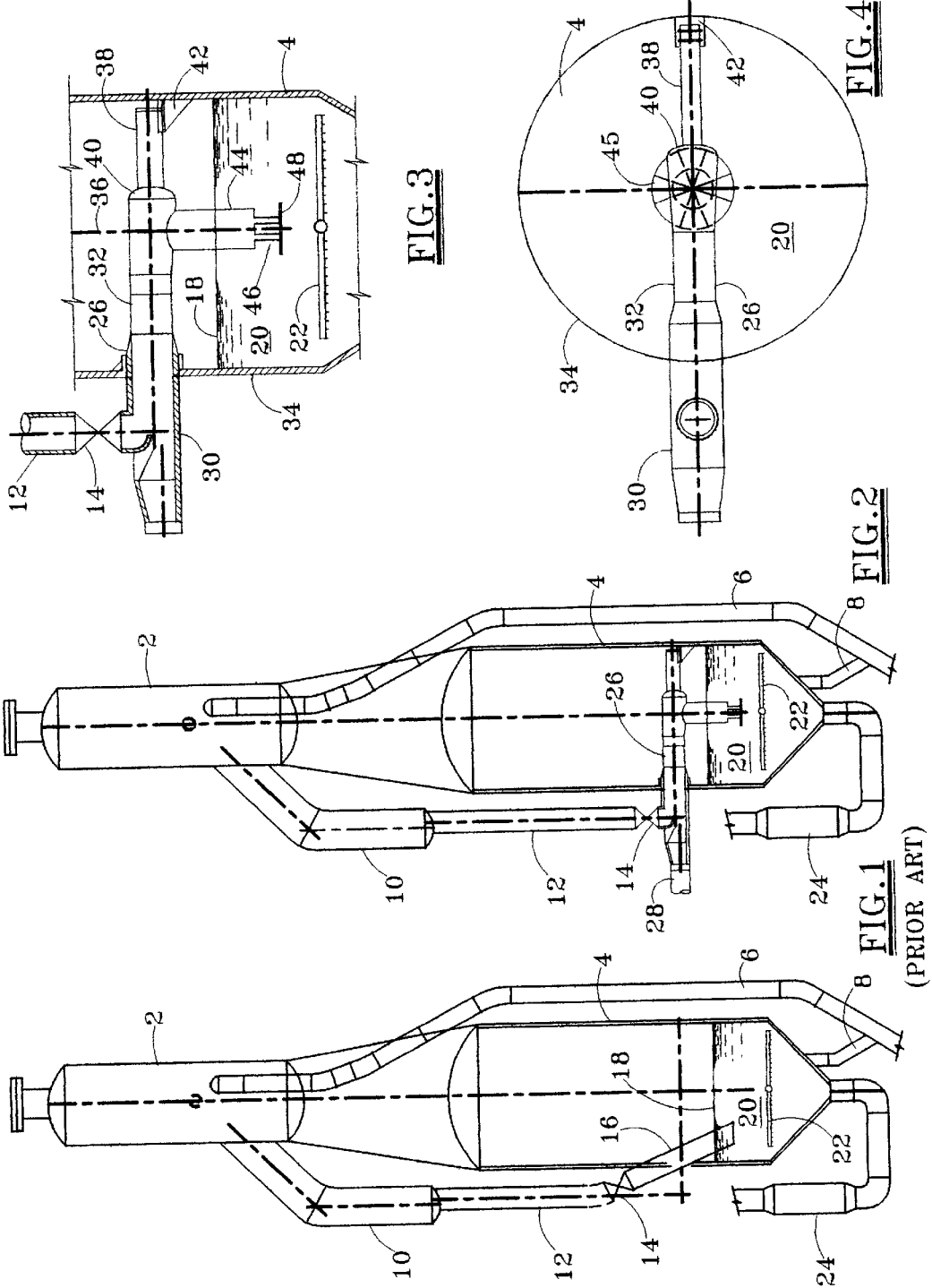

SPENT CATALYST DISTRIBUTION

Field of the Invention

The present invention relates to the introduction and distribution of a spent catalyst from a fluid catalytic cracking unit to facilitate regeneration of the catalyst. More particularly, the present invention relates to an apparatus and method for more uniformly distributing the spent catalyst into a catalyst bed in the regenerator.

BACKGROUND OF THE INVENTION

Fluid catalytic cracking is well known for converting heavy distillate oil to lower molecular weight compounds in the boiling range of gasoline and middle distillate. The feedstock is mixed with small particles of catalyst in a riser to a reactor. The catalyst particles are recovered from the reactor, stripped with steam and fed to a regenerator. In the regenerator, air is used to burn off coke deposits on the spent catalyst particles to regenerate the catalyst for recirculation into the riser.

In many early units, the regenerator was positioned above the elevation of the reactor. This allowed a low regenerator pressure to be used, but involved a dilute phase transfer line for conveying catalyst from the reactor to the bottom of the regenerator. In a subsequent design, the regenerator and reactor were positioned at about the same elevation, but the spent catalyst was still introduced at the bottom of the regenerator.

In later designs, the reactor was positioned above the regenerator and the spent catalyst was fed from the reactor to a side entry of the regenerator by gravity flow using a slide valve to control the flow rate. All of the regeneration air was introduced at a grid near the bottom of the regenerator. These units with side entry spent catalyst introduction into the regenerator were typically designed and operated for oxygenlean conditions in which the excess oxygen supplied in the regeneration air was typically about 0.1 volume percent. This resulted in a carbon monoxide content in the regenerator offgas of about 10 volume percent. The carbon on regenerated catalyst (CORC) was typically 0.5 weight percent, and the coke yield was about 6 weight percent.

More recently, with a trend toward improving gasoline yield, it has been desired to operate with a more complete CO combustion using a slight excess of oxygen, typically 2 volume percent oxygen in the regenerator offgas. This results in a CORC of about 0.05 weight percent, a CO content in the regenerator offgas of about 100 ppm and a coke yield of approximately 4.5 percent. However, with the side entry of spent catalyst in the regenerator, high concentrations of coke on one side of the bed and lower concentrations of coke elsewhere results in a serious problem known as afterburning. This occurs when the offgas leaving high coke areas of the dense phase bed of catalyst in the regenerator is not completely combusted, while other areas of the bed produce an offgas with a higher-than-average excess oxygen. When the two combine in the regenerator dilute phase, there would be combustion of the oxygen and CO and very high dilute phase temperatures would be produced, due to a lack of catalyst (heat sink) to absorb the heat of combustion.

Many attempts were made to avoid the afterburning condition. For example, a ski jump baffle was sometimes installed to improve mixing of the spent catalyst as it entered the regenerator.

SUMMARY OF THE INVENTION

The present invention uses a portion of the regeneration air to convey and distribute the spent catalyst into a dense phase bed in the regenerator from a nozzle positioned along a central axis of the regenerator vessel. This blows the spent catalyst out into the dense phase to achieve a better mixing of the higher coke content "black" spent catalyst with the low coke content "white" regenerated catalyst in the dense phase bed to obtain a substantially uniform and even distribution of the coke deposits in the bed. All areas of the fluid bed then evolve a generally uniform offgas which has about the same CO and oxygen content. Thus, dilute phase CO combustion is generally avoided. One advantage of the invention relative to prior dilute phase spent catalyst conveying systems is that the catalyst generally flows downwardly so that less conveying air is needed and there is less tendency for the catalyst to slump or plug in the transfer line. An additional advantage of the present invention is that in a retrofit of an existing unit, the existing air distribution system requires minimal modification, and the existing compressor for supplying air to the regenerator can be used to supply the regeneration air for conveying the spent catalyst.

Accordingly, in one aspect the present invention provides apparatus for regenerating spent fluid catalytic cracking (FCC) catalyst. The apparatus includes a regenerator vessel housing a dense phase bed of fluidized catalyst at an interface with a dilute phase. A first air line supplies a first portion of regenerating air to an air distribution system disposed in the dense phase. A second air line supplies a second portion of regenerating air to a spent catalyst line for conveying the spent catalyst horizontally or horizontally and downwardly into the regenerator vessel. A centrally disposed spent catalyst distributor discharges the spent catalyst from the spent catalyst line into the dense phase bed below the interface, preferably above the air distribution grid. A catalyst recovery line receives regenerated catalyst from the dense phase bed, preferably below the air distribution system. An offgas recovery line receives offgas from the dilute phase.

In another aspect, the invention provides an improvement in a method for operating a regenerator of an FCC unit. The method includes introducing spent catalyst to a dense phase bed in the regenerator, supplying regeneration air to an air distribution system in a lower portion of the dense phase bed to burn off coke deposited on the spent catalyst and regenerate the catalyst, recovering regenerated catalyst from the dense phase bed below the air distribution grid, and recovering an offgas from a dilute phase above the dense phase bed of the regenerator. The improvement comprises horizontally and/or downwardly conveying the spent catalyst to a spent catalyst distributor using from 10 to 50 percent of the regeneration air. Spent catalyst is discharged into the dense phase bed, preferably through a plurality of radially spaced openings formed in an outer surface of the spent catalyst distributor. From 50 to 90 percent of the regeneration air can be supplied to the air distribution system. The regenerator offgas preferably comprises up to 2 volume percent oxygen and less than 100 ppm carbon monoxide, and the regenerated catalyst contains less than 0.05 weight percent carbon.

In a further aspect, the present invention provides a method for retrofitting of FCC regenerator apparatus which includes an upright cylindrical regenerator vessel disposed below or beside a reactor vessel, a line for introducing spent catalyst into a dense phase of catalyst adjacent a vertical wall of the regenerator vessel, an air distribution system for introducing substantially all of the regeneration air into the dense phase, a compressor for supplying the regeneration air to the air distribution system, and a line for transferring regenerated catalyst into a riser to the reactor vessel. The method includes the steps of:

(a) installing a catalyst distribution nozzle along a central vertical axis of the regenerator vessel for radially discharging a mixture of the spent catalyst and a portion of the regeneration air into the dense phase below an interface of the dense phase with a gaseous phase;

(b) modifying the spent catalyst line to supply the spent catalyst to the catalyst distribution nozzle;

(c) installing a line to supply from 10 to 50 percent of the regeneration air to the modified spent catalyst line; and (d) operating the regenerator apparatus to supply from 50 to 90 percent of the regeneration air to the air distribution system.

The existing compressor is preferably used to supply the regeneration air to the modified spent catalyst line and the air distribution system. The method can further include the step of replacing the air distribution system before operating the modified unit.

BRIEF DESCRIPTION OF THE DRAWINGS

FIG. 1 (prior art) is an elevation of a conventional regenerator-reactor configuration with side entry of the spent catalyst into the regenerator vessel.

FIG. 2 is an elevation of the regenerator-reactor configuration of FIG. 1 modified to include the spent catalyst distribution nozzle according to one embodiment of the present invention.

FIG. 3 is an enlarged elevation, partly in section, of the air distribution nozzle in the regenerator of FIG. 2.

FIG. 4 is a plan view of the regenerator and spent catalyst distribution nozzle of FIG. 3.

DETAILED DESCRIPTION OF THE INVENTION

Figure 5:
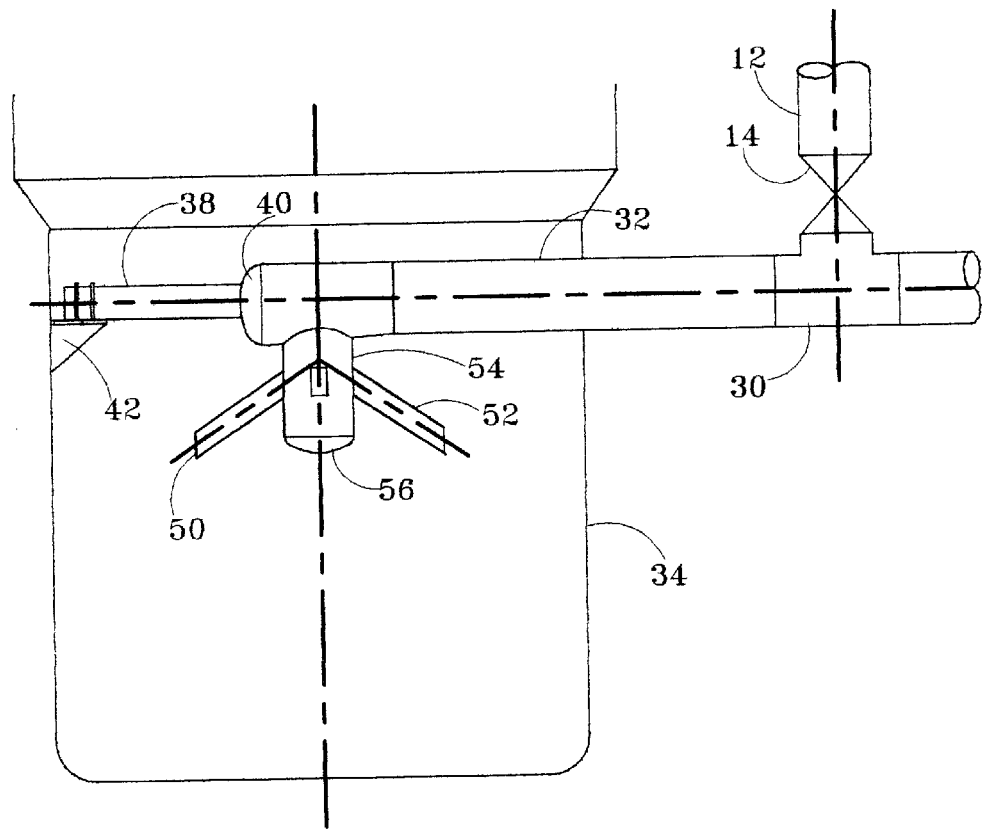
FIG. 5 is an elevation of a spent catalyst distribution nozzle according to an alternate embodiment of the present invention.

The present invention is best suited to modification of existing units such as illustrated in FIG. 1. However, the invention can also be used, if desired, in the construction of new fluid catalytic cracking (FCC) units, and is not necessarily restricted to the modification of existing units. The FCC unit of FIG. 1 includes reactor 2, regenerator 4 and riser 6. Feedstock is introduced at a lower end of the riser 6 where it is mixed with regenerated catalyst supplied from the regenerator 4 via line 8. Spent catalyst flows from the reactor 2 into steam stripper 10 and then to catalyst transfer line 12. The flow of spent catalyst from line 12 is controlled by slide valve 14 and introduced to the regenerator 4 via side entry port 16. The lower end of side entry port 16 is below the interface 18 of a dense phase catalyst bed 20. Regeneration air is supplied to air distribution system 22 by a compressor (not shown). An air heater 24 is typically used during startup.

According to the present invention, the existing apparatus of FIG. 1 is modified by installing a spent catalyst distribution apparatus 26 in place of the side entry port 16. The line 12 and valve 14, depending on the configuration of the unit, may be modified to accommodate spent catalyst distribution apparatus 26, or may be replaced.

An air supply line 28 is also connected to the air distribution apparatus 26. The air supply line 28 supplies from 10 to 50 percent of the regeneration air, preferably from about 20 to about 25 percent of the regeneration air. The remaining air is supplied to the air distribution system 22 which may be the existing air distribution grid, or may be a new air distribution grid installed while the unit is down for modification and installation of the spent catalyst distribution apparatus 26. The air supply to line 28 is preferably from the existing compressor, as stated, by tapping into the line previously used to supply the air only to the air distribution grid 22.

The spent catalyst distribution apparatus 26, as best seen in FIGS. 3 and 4, has a mixing elbow 30 which receives air from the supply line 28 and spent catalyst from the standpipe 12 via valve 14. The spent catalyst is introduced at the top of the mixing elbow 30. The air is introduced from the line 28 to convey the mixture of air and spent catalyst into a horizontal pipe 32 which extends through an outer wall 34 of the regenerator 4 to a central region of the regenerator 4 along a central longitudinal axis 36 thereof.

A support 38 is welded to an end cap 40 on the pipe 32. The support 38 extends across the remaining width of the regenerator 4 to rest on a bracket mounted on the wall 34 of the regenerator 4 opposite the entry point of the horizontal pipe 32. There is a suitable gap between the end of the support 38 and the wall 34 to allow for thermal expansion and contraction. A vertical pipe section 14 descends from the horizontal pipe 32 along the central longitudinal axis 36. The vertical pipe section 44 terminates below the interface 18, but above the air distribution grid 22. A plurality of radial slots 46 are formed in regularly spaced radial position at the lower terminus of the vertical pipe section 44. A deflector plate 48 is welded to the end of the vertical pipe 44 adjacent the radial slots 46. If desired, the deflector plate 48 may be conically shaped with a slope that facilitates catalyst ejection downwardly and outwardly from the vertical pipe 44.

Figure 6:
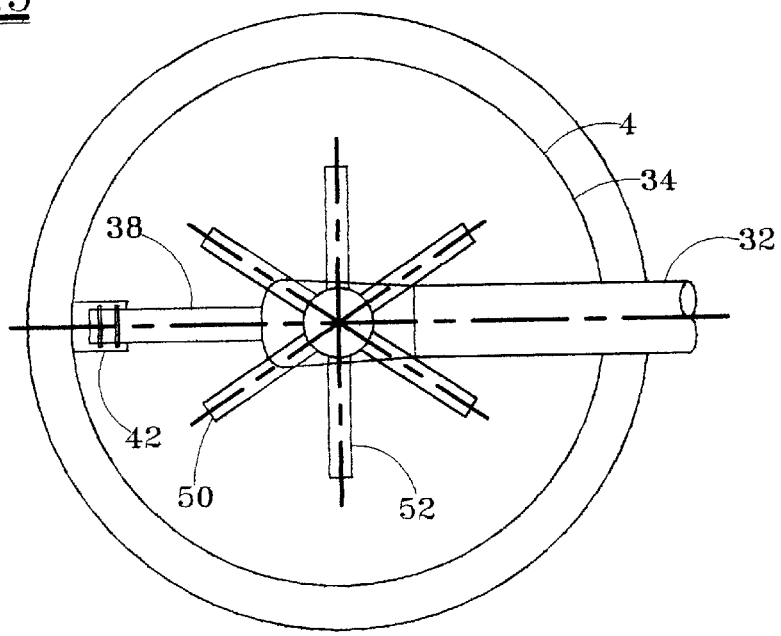
FIG. 6 is a plan view of the spent catalyst distribution nozzle of FIG. 5.

In the alternate embodiment shown in FIGS. 5 and 6, a plurality of discharge openings 50 are provided at the ends of downwardly sloped, outwardly extending chutes or arms 52 connected near a lower end of the vertical pipe section 54. An end cap 56 is provided at the lowermost end of the vertical pipe section 54 to direct the spent catalyst through the radial arms 52. In this embodiment, the spent catalyst is distributed at a number of circumferentially arranged points along a circle spaced from the outer wall 34 of the regenerator vessel 4. In FIGS. 5 and 6, six radial arms 52 are illustrated as typical, but more or less than this number can be employed with similar benefits.

EXAMPLE

An existing vessel as shown in FIG. 1 is modified to conform to the features shown in FIG. 2 according to one embodiment of the present invention. This is done by installing the spent catalyst distribution apparatus 26 as illustrated in FIGS. 3 and 4. The air line 28 is connected to the discharge duct of the existing compressor used to supply the regenerator air to the air distribution grid. The key dimensions and operating characteristics of the unit before and after modification are presented in the Table.

TABLE

|  | Existing FCC Unit | Modified FCC Unit |
|---|---|---|
| Regenerator 4 Diameter, feet | 26 | 26 |
| Coke Burning Rate, lbs/hr | 30,000 | 30,000 |
| Total Air to Regenerator 4, lbs/hr | 413,900 | 413,900 |

TABLE-continued

|  | Existing FCC Unit | Modified FCC Unit |
| --- | --- | --- |
| Air to Regenerator Grid 22, lbs/hr | 413,900 | 330,900 |
| Air to Spent Catalyst Distributor 26, lbs/hr | Not Applicable | 83,900 |
| Regenerator Bed 20 Temperature, °F. | 1313 | 1313 |
| Regenerator 4 Dilute Phase Temperature, °F. | 1403 | 1333 |
| Regenerator 4 Top Operating Pressure, psig | 25 | 25 |
| Pressure of Air to Grid 22, psig | 29 | 29 |
| Pressure of Air to Spent Catalyst Distributor 26, psig | Not Applicable | 28 |
| Flue Gas Composition, Mole % | | |
| O2 | 1.4 | 1.4 |
| CO | 0.025 | 0.015 |
| CO2 | 15.5 | 15.5 |
| N2 | 74.8 | 74.8 |
| Carbon on Regenerated Catalyst, wt % | 0.08 | 0.03 |
| Amount of Afterburning, °F. | 90 | 20 |

The invention is illustrated by the foregoing description and by way of reference to the specific embodiments as an example, and not as a limitation on the scope of the invention. Various modifications and changes will become apparent to those skilled in the art in view of the foregoing description. It is intended that all such variations and modifications within the scope and spirit of the appended claims be embraced thereby.

We claim:

1. In a method for operating a regenerator of a fluid catalytic cracking unit comprising introducing spent catalyst to a dense phase bed in the regenerator, supplying regeneration air to an air distribution grid in a lower portion of the dense phase bed to burn off coke deposited on the spent catalyst and regenerate the catalyst, recovering regenerated catalyst from the dense phase bed, and recovering an off gas from a dilute phase above the dense phase bed of the regenerator, the improvement comprising:

splitting the regeneration air to feed regeneration air into a spent catalyst distributor and an air distribution grid;

conveying the spent catalyst horizontally or horizontally and downwardly to the spent catalyst distributor using from 10 to 50 percent of the regeneration air;

discharging spent catalyst into the dense phase bed; and supplying the remaining 50 to 90 percent of the regeneration air to the air distribution grid.

2. The improvement of claim 1 wherein spent catalyst is discharged into the dense bed through a plurality of radially spaced openings formed in an outer surface of a tubular end of the spent catalyst distributor.

3. The improvement of claim 1 wherein the regenerator off gas comprises up to 2 volume percent oxygen and less than 100 ppm carbon monoxide, and the regenerated catalyst contains less than 0.05 weight percent carbon.

4. A method for retrofitting fluid catalytic cracking regenerator apparatus comprising an upright cylindrical regenerator vessel disposed below or beside a reactor vessel, a line for introducing spent catalyst into a dense phase of catalyst adjacent a vertical wall of the regenerator vessel, an air distribution system for introducing substantially all of the regeneration air into the dense phase, a compressor for supplying the regeneration air to the air distribution grid, and a line for transferring regenerated catalyst into a riser to the reactor vessel, comprising the steps of:

installing a catalyst distribution nozzle along a central vertical axis of the regenerator vessel for radially discharging a mixture of the spent catalyst and a portion of the regeneration air into the dense phase below an interface of the dense phase with a gaseous phase;

modifying the spent catalyst line to supply the spent catalyst to the catalyst distribution nozzle;

installing a second line from the compressor to the modified spent catalyst line to supply from 10 to 50 percent of the regeneration air to the modified spent catalyst line; and operating the regenerator apparatus to supply from 50 to 90 percent of the regeneration air to the air distribution grid.

5. The method of claim 4, wherein the existing compressor is used to supply the regeneration air to the modified spent catalyst line and the air distribution grid.

6. The method of claim 4, further comprising the step of replacing the air distribution grid before said step of operating the regenerator apparatus.

* * * * *